United States Patent [19]

Wakae et al.

[11] 3,891,762
[45] June 24, 1975

[54] METHOD FOR COMBATTING BACTERIAL PLANT DISEASES USING 2-AMINO-1,3,4-THIADIOZOLES

[75] Inventors: Osamu Wakae; Kunito Yakushiji, both of Kyoto; Yoshiyuki Okada, Osaka, all of Japan

[73] Assignee: Takeda Chemical Industries, Ltd., Japan

[22] Filed: Jan. 8, 1974

[21] Appl. No.: 431,601

Related U.S. Application Data

[63] Continuation-in-part of Ser. No. 191,101, Oct. 21, 1971, which is a continuation of Ser. No. 824,251, May 13, 1969, abandoned.

[30] Foreign Application Priority Data

May 13, 1968 Japan................................ 43-32098
Sept. 2, 1968 Japan................................ 43-62866
Apr. 14, 1969 Japan................................ 44-28826

[52] U.S. Cl............................. 424/270; 424/DIG. 8
[51] Int. Cl............................ A01n 9/12; A01n 9/20
[58] Field of Search..................... 424/270, DIG. 8; 260/306.8 D

[56] References Cited
UNITED STATES PATENTS

| 3,429,688 | 2/1969 | Duerr et al. ............................ 71/90 |
| 3,522,267 | 7/1970 | Duerr et al. ...................... 260/306.7 |
| 3,598,830 | 8/1971 | Berkelhammer et al. ...... 260/302 D |

OTHER PUBLICATIONS

Sarles et al., Microbiology General and Applied 2nd Ed., 1951, pp. 461–462.
Blair et al., Manual of Clinical Microbiology 1970, p. 176.
Weuffen et al., Pharmazie 20(10), 629–33 (1965).
Petrow et al., Chem. Abst. vol. 52, pp. 20136–20137 (1958).

*Primary Examiner*—Jerome D. Goldberg
*Assistant Examiner*—Allen J. Robinson
*Attorney, Agent, or Firm*—Wenderoth, Lind & Ponack

[57] ABSTRACT

2-amino-1,3,4-thiadiazole is useful in combatting bacterial plant diseases, when applied to a plant afflicted with the diseases.

8 Claims, No Drawings

METHOD FOR COMBATTING BACTERIAL PLANT DISEASES USING 2-AMINO-1,3,4-THIADIOZOLES

This application is a continuation-in-part of application Ser. No. 191,101, filed Oct. 21, 1971, which is in turn a continuation of application Ser. No. 824,251, filed May 13, 1969, now abandoned.

This invention relates to a method for combatting bacterial plant diseases (e.g., leaf blight of rice plant, citrus canker, tomato bacterial wilt, etc.), said method comprises applying a bacterially effective but non-phytotoxic amount of 2-amino-1,3,4-thiadiazole to a plant afflicted with the diseases.

It is known that 2-amino-1,3,4-thidiazole has a slight antibacterial activity in vitro against *Pseudomonas aeruginosa* which is liable to cause pyogenic inflammation in animals. However, the activity is so weak as to be a minimum inhibitory concentration (MIC) of 15mg./ml. against the bacteria, the compound was thought as practically useless for the purpose of combating said infectious bacteria. (See S. Weuffen et al. Pharmazie 20(10),629–633(1965))

It has now been found by the present inventors that the same compound exhibits far stronger antibacterial activity, i.e. at a level of MIC as low as 0.0005mg./ml.–0.02mg./ml., against phytopathogenic bacteria, especially those of the genus Xanthomonas such as *Xanthomonas citri*, *Xanthomonas hyacinthi*, *Xanthomonas oryzae*, *Xanthomonas phaseoli* and *Xanthomonas pruni*, and also specifically against the species *Pseudomonas solanacearum* which is known as causing bacterial wilt in tomato.

Furthermore, the present inventor's study has revealed that not only said 2-amino-1,3,4-thiadiazole, including its acid addition salts, but also its derivatives at the amino group can combat the bacterial plant diseases caused by the infection of said Xanthomonas species or of said phytopathogenic Pseudomonas solanacearum; and also that the combatting activity is systemic and infiltrating into the plant tissue.

Therefore, it is the principal object of this invention to provide a method for combatting bacterial plant diseases, the action being both preventive and therapeutic against the infection of the phytopathogenic bacteria, rendering no substantial phytotoxicity.

Another object is to provide a fungicide which is hardly toxic against both human beings and animals as well as fishes.

Further object is to provide a concentrate form of said fungicide, which is applicable, simply diluted at the use, to the host for the same purposes as mentioned just above, and which is more stable and more convenient in storage or transport than the diluted composition for the ready use to the plant.

Further object is to provide a systemic fungicide which shows a strong infiltrating action to plants.

Other objects will be apparent from the description detailed hereinafter in this specification.

The derivatives of 2-amino-1,3,4-thiadiazole are the compounds of the formula [I], including acid addition salts:

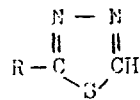

wherein R is acyl amino having up to 18 carbon atoms, substituted or unsubstituted carbamoyl (or thiocarbamoyl) amino, nitrosoamino, nitroamino, lower alkoxymethylideneamino having up to 5 carbon atoms, substituted or unsubstituted phenoxy carbonylamino, substituted or unsubstituted benzene-sulfonamido, lower alkoxy carbonylamino having up to 5 carbon atoms or a group represented by

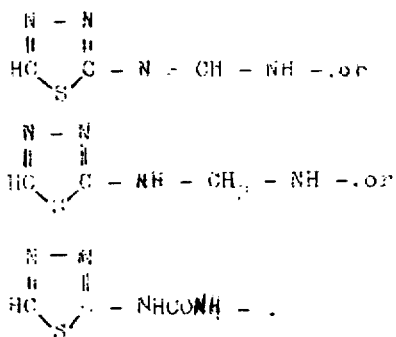

As regards the above-mentioned formula [I], the acylamino group exemplified by aliphatic acylamino groups such as formamido, acetamido, propionamido, butanamido, pentanamido, decanamido, tetradecanamido, 9-octadecenamido, octadecanamido, chloroacetamido, β-carboxypropionamido, β-ethoxycarbonylpropionamido, β-buthoxycarbonylpropionamido, etc., and substituted or unsubstituted aromatic acylamino groups such as benzamido, chlorobenzamido and the like. The substituted or unsubstituted carbamoylamino group includes, for example, ureido, 3-methylureido, 3,3-dimethylureido, 3-phenylureido, 3-(4-chorophenyl)ureido, etc., while the substituted or unsubstituted thiocarbamoylamino group includes thioureido, 3-methylthioureido, 3-ethylthioureido, 3,3-dimethylthioureido, 3-phenylthioureido and the like. The lower alkoxymethylideneamino group is exemplified by methoxymethylideneamino, ethoxymethylideneamino, propoxymethylideneamino and the like. The substituted or unsubstituted phenoxy carbonylamino group includes, for example, phenoxycarbonylamino, 3-methylphenoxycarbonylamino, 4-methylphenoxycarbonylamino, 2-chlorophenoxycarbonylamino, 4-cholrophenoxycarbonylamino, and the like. The substituted or unsubstituted benzene sulfonamido group includes, for example, benzensulfonamido, 4-chlorobenzenesulfonamido and the like.

It is to be noted that the 2-amino-1, 3, 4-thiadiazole derivitatives of the formula [I] do not show so strong antibacterial activity in vitro as 2-amino-1,3,4-thiadiazole derivatives of the formula [I] do not show so strong antibacterial activity in vitro as 2-amino-1,3,4-thiadiazole itself does, when evaluated in terms of inhibitory concentrations; nevertheless, the derivatives of the formula [I] are substantially as effective as 2-amino-1,3-thiadiazole on the same molar basis in field applications to the plant afflicted with the bacterial plant diseases. From these facts, it is believed that the derivatives of the formula [I] act as the bactericides in the form of 2-amino-1,3,4-thiadiazole liberated from the derivatives themselves on or around the plants.

The 2-amino-1,3,4-thiadiazole compounds may be used in the form of acid addition salts. The salts may be such inorganic salts as the hydrochloride, nitrate, thiocyanate, sulfate, etc. or such organic salts as oxalates, acetates, p-toluenesulfonates etc. Some representative 2-amino-1,3,4-thiadiazole compounds, accompanied by their melting points (mp.) or decomposition temperatures (decp.), are shown below.

1. 2-amino-1,3,4-thiadiazole (free base, mp. 191°C).
2. 2-amino-1,3,4-thiadiazole (hydrochloride monohydrate, mp. 83°–84°C),
3. 2-amino-1,3,4-thiadiazole (oxalate, mp. 197°–198°C)
4. 2-amino-1,3,4-thiadiazole (thiocyanate, mp. 145°–146°C)
5. 2-formamido-1,3,4-thiadiazole, mp. 220°–221°C.
6. 2-acetamido-1,3,4-thiadiazole, mp. 269°–269°C.
7. 2-propionamido-1,3,4-thiadiazole, mp. 229°–230°C.
8. 2-(n-butamanido)-1,3,4-thiadiazole, mp. 179°C.
9. 2-(isopentanamido)-1,3,4-thiadiazole, mp. 162°–163°C.
11. 2-chloroacetamido-1,3,4-thiadiazole, mp. 185°–186°C. (decp.)
12. 2-(n-decanamido)-1,3,4-thiadiazole, mp. 185°–186°C.
10. 2-(n-decanamido)-1,3,4-thiadiazole, mp. 141°–143°C.
10. 2-benzamido-1,3,4-thiadiazole, mp. 262°–263°C.
13. 2-(p-chlorobenzamido)-1,3,4-thiadiazole, mp. 262°–263°C.
14. 2-($\beta$-carboxypropionamido)-1,3,4-thiadiazole, mp. 170°C.
15. 2-($\beta$-ethoxycarbonylpropionamido)-1,3,4-thiadiazole, mp. 229°–230°C.
16. 2-ureido-1,3,4-thiadiazole, mp. 270°C.
17. 2-(3-methylureido)-1,3,4-thiadiazole, mp. 226°–227°C.
18. 2-(3-ethylthioureido)-1,3,4-thiadiazole, mp. 217.5°C.
19. 2-nitrosoamino-1,3,4-thiadiazole, mp. 221°C. (decp.)
20. 2-nitroamino-1,3,4-thiadiazole, mp. 174°–175°C. (decp.)
21. Ethyl N-(1,3,4-thiadiazole-2-yl)formimidate, mp. 40°–41°C.
22. N,N'-bis(1,3,4-thiadiazole-2-yl)formamidine, mp. 240°C.
23. N,N'-bis(1,3,4-thiadiazole-2-yl)urea, mp. 280°C.
24. N,N'-methylene-bis(2-amino-1,3,4-thiadiazole), mp. 197°–198°C.
25. 2-tetradecanamido-1,3,4-thiadiazole, mp. 133.5°–134.5°C.
26. 2(9-octodecenamido)-1,3,5-thiadiazole, mp. 106°–107°C.
27. 2-octadecanamido-1,3,4-thiadiazole, mp. 134°–135°C.
28. 2-phenoxycarbonylamino-1,3,4-thiadiazole, mp. 239°–240°C.
29. 2-(3-methyphenoxycarbonylamino)-1,3,4-thiadiazole, mp. 224°C. (decp.)
30. 2-(4-methylphenoxycarbonylamino)-1,3,4-thiadiazole, mp. 224°–225°C (decp.)
31. 2-(2-chlorophenoxycarbonylamino)-1,3,4-thiadiazole, mp. 196°–197°C.
32. 2-(4-chlorophenoxycarbonylamino)-1,3,4-thiadiazole, mp. 240°C. (decp.)
33. 2-(3-methylthioureido)-1,3,4-thiadiazole, mp. 226°C.
34. 2-(3-phenylthioureido)-1,3,4-thiadiazole, mp. 200°C. (decp.)
35. 2-(4-chlorobenzenesulfonamido)-1,3,4-thiadiazole, mp. 203°–205°C.
36. 2-benzenesulfonamido-1,3,4-thiadiazole, mp. 179°–180°C.
37. 2-[3-(4-chlorophenyl)ureido]-1,3,4-thiadiazole, mp. 242°C. (decp.)
38. 2-isopropoxycarbonylamino-1,3,4-thiadiazole, mp. 186°–187°C.

These compounds show very low toxicity against mammals, for example, $LD_{50}$ of the compound (1) is mg/kg mg.kg in oral administration in mice, and that of the compound (5) is 2900 mg/kg. The toxicity to fishes of these compounds are also very low, e.g. TLm (median Tolerance Limit) of the compound (1) against Oryzias Latipes is larger than 10 ppm, and that of the compound (5) is larger than 10 ppm, and that of the compound (24) is larger than 10 ppm.

The above mentioned 2-amino-1,3,4-thiadiazole compounds are prepared, for example, by the following methods.

A. Compounds (5) to (15) and (25) to (26): may be obtained by a conventional acylation of the free 2-amino-1,3,4-thiadiazole.

B. compounds (28) to (32) and (38): may be obtained by a reaction of 2-amino-1,3,4-thiadiazole with an alkyl chloroformate or phenyl chloroformate in the presence of a base, respectively.

C. Compound (16): may be obtained by a reaction of 2-amino-1,3,4-thiadiazole hydrochloride with sodium cyanate.

D. Compounds (17) and (37): may be obtained by a reaction of 2-amino-1,3,4-thiadiazole with an isocyanate.

E. Compounds (18), (33) and (34): may be obtained by a reaction of 2-amino-1,3,4-thiadiazole with an isothiocyanate.

F. Compound (22): may be obtained by heating 2-amino-1,3,4-thiadiazole in ethyl orthoformate.

G. Compound (23): may be obtained by a reaction of 2-amino-1,3,4-thiadiazole with phosgene.

H. Compound (24): may be obtained in such a manner as the following: To a solution of 10.1 parts by weight of 2-amino-1,3,4-thiadiazole dissolved in 60 parts by volume of concentrated hydrochloric acid is added 1.8 parts by weight of paraformaldehyde. After left standing for a whole day and night under stirring at room temperature, the reaction mixture is subjected to distillation under reduced pressure to remove concentrated hydrochloric acid. The residue is dissolved in water and the resulting solution is neutralized by an aqueous solution of sodium hydroxide to obtain the objective compound (24) in a crystalline form. (Yield 98%)

The composition of this invention may be applied to plants in any suitable manner. For example, depending on specific purposes, the active compound or a salt thereof can be directly applied itself as a fungicide, but it is preferably put into use in such a composition form as a solution, suspension or emulsion in a suitable liquid carrier, or as a solid mixture with a suitable carrier (e.g., a diluent or an adjuvant), the solid mixture being prepared by admixing the finely pulverized ingredients or by having the compound adsorbed on a suitable solid carrier. On preparation of said composition, there may be used, together with or as a part of carrier, such adjuvants an an emulsifier, a suspension aid, a dispersing agent, a spreader, a penetrating agent, a wetting agent, and a stabilizer. The fungicides of the present invention may be applied in the form of, for example, solutions, emulsions, wettable powders, dusts, tablets, granules, aerosols, etc.

The preferred liquid carriers to be employed in this invention include, for example, alcohols (e.g., methyl alcohol, ethyl alcohol and ethylene glycol), ketones (e.g., acetone and methylethyl ketone), aliphatic hydrocarbons (e.g., gasoline, kerosene and machine oil), aromatic hydrocarbons (e.g., benzene, xylene and methylnapthalene), halogenated hydrocarbons (e.g., chloroform and carbon tetrachloride), acid amides (e.g., dimethyl formamide), esters (e.g., ethyl acetate), nitriles (e.g., acetonitrile). These liquid carriers may be used either singly or as a mixutre of two or more thereof.

The solid carriers are exemplified by vegetable powder, tobacco powder, wheat powder and wood powder, mineral powders, (e.g. kaolin, bentonite, acid clay, talc, agalmatolite powder, diatomaceous earth, mica powder, alumina, sulfur powder, activated carbon), Those solid carriers may be used either singly or in combination. Surface active agents which can be used as said emulsifier, spreader, penetrating agnet or dispersing agent are exemplified by soaps, the sulfuric acid esters of higher alcohols, alkanesulfonates, alkylarylsulfonates, quaternary ammonium salts, oxyalkylamines, fatty acid esters of polyhydric alcohols, and other surface active agents or polyalkylene oxide type and anhydrosorbitol type etc. Casein, gelatin, starch, alginic acid, agar, polyvinyl alcohol, cresol soap and the like, as occasion demands, may also be used for the same purpose.

A concentration of the active ingredients in the present fungicides ready for use is usually from about 0.001% to about 0.2% by weight, more preferably about 0.01% to about 0.05% by weight, in case of the liquid form (i.e., solution, suspension or emulsion); while in the case of the solid composition, from about 0.1% to about 10% by weight, about 1% to about 5% by weight is preferable. But, upon necessity, a composition containing at a higher or lower concentration than the abovementioned value may be put into use.

It is further possible to admix the composition of the invention so far described with other ingredients (e.g., copper germicides, organic sulfur germicides, organic chlorine germicides, organophosphate germicides, antibiotics), insecticides (e.g., organic chlorine insecticides, organic phosphor insecticides, natural type insecticides), as well as acaricides, herbicides, plant growth regulators, synergistic agents, attractants, repellants, scents, plant nutrients, fertilizers and the like; these being to be construed as adjuvants or a part of the carriers in the composition of the present invention.

From a commerical and practical point of view, it is more preferable that the composition of the present invention is made in a concentrate form, whihc is not only compact and handy but also provides higher stability of the active ingredient in storage or transport that the composition ready for use.

Such concentrate composition may take the form of oil, emulsifiable concentrate, wettable powder, dust, tablet and granular as the case may be, and is usually prepared so as to contain from about 0.5% to about 80% by weight of the active ingredient or active ingredients relative to the concentrate composition with or without the above-mentioned adjuvants. The concentrate composition is diluted by or dissolved in the above-exemplified carriers or solvents at the practical application to the plant.

The fungicidal effect of the present composition will be illustrated by way of the following experiments and examples. In these experiments or examples as well as in the foregoing descriptions, the following abbreviations are employed: cm means centimeter(s), mm means millimeter(s), ml means milliliter(s), g means gram(s), $\mu$g centigrade. microgram(s), a means are(s), and °C means degree centegrade. (In the data, the numerals (1), (2), ... represent the compounds respectively designated by same numerals in the following list of compounds).

Experiment 1

Rice leaf blight control test

Procedure ... Kinmaze rice plants were cultivated in 9-cm pots, 10 seedlings per pot, and a leaf blight control experiment was conducted on 25-day seedlings, 4 pots per treatment in duplicate. The uppermost unfolded leaf of each seedling was stabbed with a needle carrying a cell suspension of *Xanthomonas oryzae* in the centerline of the blade and 2 days after inoculation, an aqueous solution or suspension of each test compound was sprayed 10 ml. per pot. Ten days after inoculation, the lengths of the diseased region that have developed were measured.

Result:

| Compound | Concentration ($\mu$g./ml.) | Average length of diseased region (mm.) | Phytotoxicity to the host |
|---|---|---|---|
| Control (untreated) | — | 94 | — |
| (1) | 250 | 4 | — |
| (2) | 250 | 6 | — |
| (3) | 250 | 7 | — |
| (4) | 250 | 6 | — |
| (5) | 250 | 5 | — |
| (6) | 250 | 7 | — |
| (7) | 250 | 9 | — |
| (8) | 250 | 7 | — |
| (9) | 250 | 13 | — |
| (10) | 250 | 18 | — |
| (11) | 250 | 7 | — |
| (12) | 250 | 11 | — |
| (13) | 250 | 15 | — |
| (14) | 250 | 4 | — |
| (15) | 250 | 6 | — |
| (16) | 250 | 11 | — |
| (17) | 250 | 18 | — |
| (18) | 250 | 9 | — |
| (19) | 250 | 10 | — |
| (20) | 250 | 12 | — |
| (21) | 250 | 8 | — |
| (22) | 250 | 6 | — |
| (23) | 250 | 6 | — |
| (24) | 250 | 0 | — |

Experiment 2

Citrus canker control test

Procedure .. Lemon seedlings were planted in 12-cm pots, followed by extensive pruning. After new shoots germinated, the control experiment was carried out, 10 pots per treatment. Each test compound was sprayed 10 ml./pot, and next day, the seedlings were spray-inoculated with a suspension of *Xathomonas citri*. The pots were placed in a humid room at 24°C for a day and, then, transferred to a greenhouse. After 20 days of inoculation, the diseased regions per leaf were counted.
Result:

| Compound | Concentration (μg./ml.) | Average number of diseased regions per leaf | Phytotoxicity to the host |
|---|---|---|---|
| Control (untreated) | — | 23.1 | — |
| (1) | 500 | 0.2 | — |
| (5) | 500 | 0.9 | — |
| (7) | 500 | 2.3 | — |
| (17) | 500 | 3.1 | — |
| (22) | 500 | 0.5 | — |
| (24) | 500 | 0 | — |

Experiment 3

Control test of tomato bacterial wilt

Procedure . . . Tomato seedlings (Ponterosa variety) were planted in galvanized iron vats (25 × 20 cm, 15 cm deep), 6 seedlings per vat. In the four-leaf stage, the soil in the locus of the plant was irrigated with a suspension of Pseudomonas solanacearum, 20 ml. per vat. Next day, each solution of the test compounds was sprinkled on the soil, 10 ml. per vat.

Four vats were assigned to each treatment. Ten days after inoculation, the percentages of infected seedlings were investigated.
Result:

| Compound | Concentration (μg./ml.) | Percent (%) of infected seedlings | Phytotoxicity to the host |
|---|---|---|---|
| Control (untreated) | — | 96 | — |
| (1) | 1000 | 0 | — |
| (2) | 1000 | 4 | — |
| (6) | 1000 | 8 | — |
| (24) | 1000 | 4 | — |

Experiment 4

Rice leaf blight control test

Procedure . . . Kinmaze rice plants were cultivated in 9-cm pots, 10 seedlings per pot, and a leaf blight control experiment was conducted on 25-day seedlings, 4-pots per treatment in duplicate. The uppermost unfolded leaf of each seedling was stabbed with a needle carrying a cell suspension of Xanthomonas oryzae in the centerline of the blade, and 2 days after inoculation, 100 μg/ml suspension of test compound (24) was sprayed 10 ml. per pot. Ten days after inoculation, the lengths of the diseased region that have developed were measured.
Result:

| Compound | Concentration (μg./ml.) | Average length of diseased region (mm.) | Phytotoxicity to the host |
|---|---|---|---|
| Control (untreated) | — | 108 | — |
| (24) | 100 | 2 | — |

Experiment 5

Field test of rice leaf blight control

Procedure . . . Seeds of Kinmaze rice plant were sowed on 10th May, and transplanted on 15th June. Each test area was 10 m² respectively and each treatment was conducted in triplicate. The test plants were infected seriously with Xanthomomas oryzae in the first 10 days of August. On 17th and 27th days August, an aqueous solution or suspension of each test compound is sprayed in the amount of 20 liters/a. On 27th day of September, ratio of the diseased region area were searched by measuring the diseased region of a hundred-leaves test area.
Result:

| Compound | Concentration (μg./ml.) | The ratio of diseased region area (%) |
|---|---|---|
| Control (untreated | — | 37.6 |
| (1) | 250 | 6.2 |
| (24) | 250 | 1.0 |

EXAMPLE 1

A wettable powder comprising a mixture of 50% 2-amino-1,3,4-thiadiazole, 2% sodium ligninsulfonate, 3% white carbon, 5% polyoxyethylenenonylphenylether and 40% clay,.

Diluted 1000 to 2000 times with water; dosage 10 to 20 liters/a.

EXAMPLE 2

A water-soluble preparation comprising a mixture of 50% 2-amino-1,3,4-thiadiazole as its hydrochloride monohydrate 50% cane sugar.

Diluted 1000 to 2000 times with water; dosage 10 to 20 liters/a.

EXAMPLE 3

A liquid preparation comprising a mixed solution of 10% 2-amino-1,3,4-thiadiazole, 10% polyoxyethylenenonylphenylether and 80% N,N'-dimethylformamide.

Diluted 300 to 500 times with water; dosage 10 to 20 liters/a.

EXAMPLE 4

A dust comprising a mixture of 3% 2-formamido-1,3,4-thiadiazole and 97% clay, dosage 300 to 500g/a. without dilution.

EXAMPLE 5

A scattering granules comprising a mixture of 3% 2-amino-1,3,4-thiadiazole and 97% bentonite, dosage 300 to 500g/a. without dilution.

EXAMPLE 6

A scattering granules comprising a mixture of 3% N,-N'-methylene-bis(2-amino-1,3,4-thiadiazole) and 97% bentonite, dosage 300 to 500g/a, without dilution.

What is claimed is:

1. A method for combatting bacterial plant diseases caused by bacteria of the genus Xanthomonas or of the species Pseudomonas solanacearum, which comprises applying to said bacteria a bactericidally effective but non-phytotoxic amount of 2-amino-1,3,4-thiadiazole.

2. The method as in claim 1, wherein 2-amino-1,3,4-thiadiazole is applied as a liquid composition containing the same in a concentration of about 0.001 to 0.2% by weight.

3. The method as in claim 1, wherein 2-amino-1,3,4-thiadiazole is applied as a powdery composition containing the same in a concentration of about 0.1 to 10% by weight.

4. The method as in claim 2, wherein the composition is concentrated to provide an active ingredient whose concentration of about 0.5 to 80% by weight and the concentrated composition is diluted prior to the application.

5. The method as in claim 1, wherein the bacterial plant disease is a Xanthomonas infection.

6. The method as in claim 5, wherein the Xanthomonas infection is rice leaf blight.

7. The method as in claim 5, wherein the Xanthomonas infection is citrus canker.

8. The method as in claim 1, wherein the bacterial plant disease is tomato bacterial wilt.

* * * * *